United States Patent
Terrill et al.

(10) Patent No.: US 8,195,155 B2
(45) Date of Patent: Jun. 5, 2012

(54) SERVICE PROFILE HANDLING IN THE IMS (75) Inventors: Stephen Terrill, Madrid (ES); Nuria Vares Esteban, Aranjuez (ES); Germán Blanco Blanco, Madrid (ES); Maria-Carmen Belinchón Vergara, Getafe (ES); Hubert Przybysz, Hagersten (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1197 days.

(21) Appl. No.: 11/913,039

(22) PCT Filed: Apr. 27, 2006

(86) PCT No.: PCT/EP2006/061880
§ 371 (c)(1),
(2), (4) Date: Oct. 29, 2007

(87) PCT Pub. No.: WO2006/117323
PCT Pub. Date: Nov. 9, 2006

(65) Prior Publication Data
US 2008/0176538 A1    Jul. 24, 2008

(30) Foreign Application Priority Data

Apr. 29, 2005 (GB) .................................. 0508690.5
Jun. 29, 2005 (GB) .................................. 0513154.5

(51) Int. Cl.
*H04W 4/00* (2009.01)

(52) U.S. Cl. .................. 455/433; 455/432.3; 455/435.1; 455/418

(58) Field of Classification Search .................. 455/433, 455/432.3, 435.1, 418
See application file for complete search history.

(56) References Cited

U.S. PATENT DOCUMENTS 6,791,971 B1 * 9/2004 Osman et al. .................. 370/352
2006/0174009 A1 * 8/2006 Martiquet et al. ............ 709/227

FOREIGN PATENT DOCUMENTS

WO    WO 03/081876 A    10/2003

OTHER PUBLICATIONS

"IP Multimedia Subsystem Stage 2 (Release 6)" 3GPP TS 23.228 V6.9.0, [Online] Mar. 2005, pp. 24-27, XP002394389.

* cited by examiner

*Primary Examiner* — Nghi Ly (57) ABSTRACT

A Home Subscriber Server for handling IP Multimedia Subsystem subscriptions comprises means for maintaining associations between public user identities and Service Profiles, where two or more public user identities can be associated with a common Service Profile, and means for identifying to a network node all public user identities that are associated with a common Service Profile.

20 Claims, 4 Drawing Sheets

SERVICE PROFILE HANDLING IN THE IMS

FIELD OF THE INVENTION

The present invention relates to a method and apparatus for Service Profile handling in the IP Multimedia Subsystem.

BACKGROUND TO THE INVENTION

IP Multimedia Subsystem (IMS) is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Release 5 and Release 6). IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (UEs) or between UEs and application servers (ASs). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Figure 1:
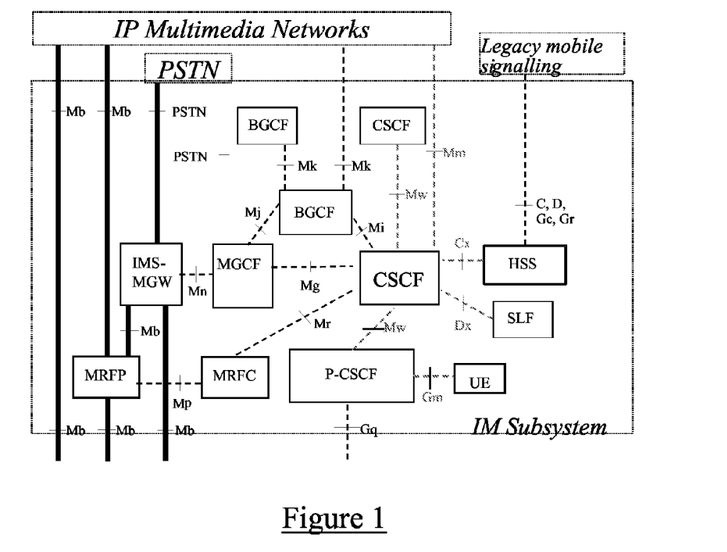
FIG. 1 illustrates schematically an IP Multimedia Subsystem architecture.

FIG. 1 illustrates schematically the IMS architecture and its internal and external interfaces. Call/Session Control Functions (CSCFs) operate as SIP entities within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers in the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling, and charging for, user access to IMS-based services. Operators may provide a mechanism for preventing direct user-to-user SIP sessions which would otherwise bypass the S-CSCF.

During the registration process, it is the responsibility of the I-CSCF to select an S-CSCF, if an S-CSCF is not already selected. The I-CSCF receives the required S-CSCF capabilities from the home network's Home Subscriber Server (HSS), and selects an appropriate S-CSCF based on the received capabilities. It is noted that S-CSCF allocation is also carried for a user by the I-CSCF in the case where the user is called by another party, and the user is not currently allocated an S-CSCF. When a registered user subsequently sends a session request to the IMS, the P-CSCF is able to forward the request to the selected S-CSCF based on information received from the S-CSCF during the registration process.

Every IMS user possesses one or more Private User Identities. A Private User Identity is assigned by the home network operator and is used by the IMS, for example for registration, authorisation, administration, and accounting purposes. This identity takes the form of a Network Access Identifier (NAI) as defined in RFC 2486. It is possible for a representation of the International Mobile Subscriber Identity (IMSI) to be contained within the NAI for the private identity. 3GPP TS 23.228 specifies the following properties of the Private User Identity:

The Private User Identity is not used for routing of SIP messages.

The Private User Identity shall be contained in all Registration requests, (including Re-registration and De-registration requests) passed from the UE to the home network.

An IP multimedia Services Identity Module (ISIM) application shall securely store one Private User Identity. It shall not be possible for the UE to modify the Private User Identity information stored on the ISIM application.

The Private User Identity is a unique global identity defined by the Home Network Operator, which may be used within the home network to identify the user's subscription (e.g. IM service capability) from a network perspective. The Private User Identity identifies the subscription, not the user.

The Private User Identity shall be permanently allocated to a user's subscription (it is not a dynamic identity), and is valid for the duration of the user's subscription with the home network.

The Private User Identity is used to identify the user's information (for example authentication information) stored within the HSS (for use for example during Registration).

The Private User Identity may be present in charging records based on operator policies.

The Private User Identity is authenticated only during registration of the user, (including re-registration and de-registration).

The HSS needs to store the Private User Identity.

The S-CSCF needs to obtain and store the Private User Identity upon registration and unregistered termination.

In addition to a Private User Identity, every IMS user shall have one or more IMS Public User Identities (IMPUs). The IMPUs are used by any user to request communications to other users. A user might for example include an IMPU (but not a Private User Identity) on a business card. 3GPP TS 23.228 specifies the following properties of the IMPU:

Both telecom numbering and Internet naming schemes can be used to address users depending on the IMPUs that the users have.

The IMPU(s) shall take the form of a SIP URI (as defined in RFC 3261 and RFC 2396 or the "tel:"-URI format defined in RFC 3966.

An ISIM application shall securely store at least one IMPU (it shall not be possible for the UE to modify the IMPU), but it is not required that all additional IMPUs be stored on the ISIM application.

An IMPU shall be registered either explicitly or implicitly before the identity can be used to originate IMS sessions and IMS session unrelated procedures.

An IMPU shall be registered either explicitly or implicitly before terminating IMS sessions and terminating IMS session unrelated procedures can be delivered to the UE of the user that the IMPU belongs to.

It shall be possible to register globally (i.e. through one single UE request) a user that has more than one IMPU via a mechanism within the IMS (e.g. by using an Implicit Registration Set). This shall not preclude the user from registering individually some of his/her IMPUs if needed.

IMPUs are not authenticated by the network during registration.

IMPUs may be used to identify the user's information within the HSS (for example during mobile terminated session set-up).

IMPUs may be used by ASs within the IMS to identify service configuration data to be applied to a user.

Figure 2:
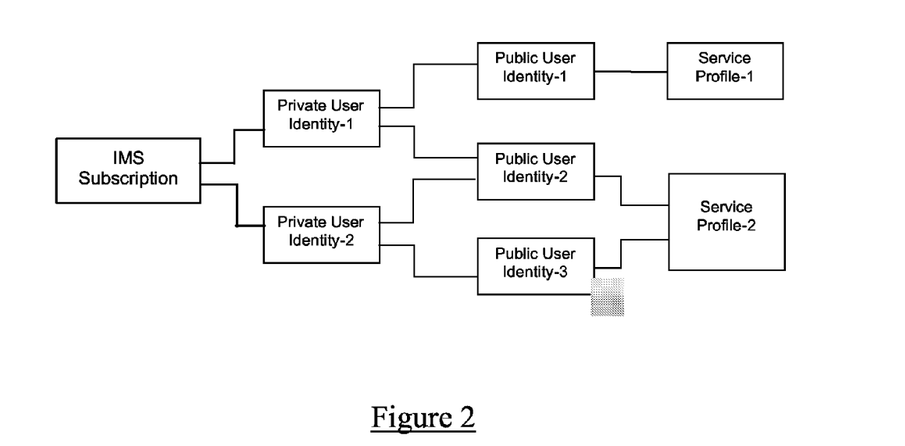
FIG. 2 illustrates schematically example relationships between a user IMS subscription and the Public and Private User Identities.

FIG. 2 illustrates schematically example relationships between a user (IMS) subscription and the Public and Private User Identities. In the example shown, a subscriber has two Private User Identities, with both being associated with two Public User Identities (one of the Public User Identities, Public User Identities-2, being associated with both Private User Identities). A Service Profile is associated with each Public User Identities, this profile specifying service data for the associated Public User Identities. A Service Profile is created or modified when an application server is provisioned for a user at the Home Subscriber Server. Each Service Profile comprises one or more initial Filter Criteria (iFC) which are used to trigger the provision, or restriction, of IMS services. The differences between services offered by Service Profile-1 and Service Profile-2 are operator specific, but may involve different application servers (ASs), and even different charging/rating schemes.

In the example, Public User Identity-1 is associated with a Service Profile-1, whilst Public User Identity-2 and Public User Identity-3 are associated with Service Profile-2. In a typical scenario, the Public User Identity-1 might be an identity that the user gives to friends and family, e.g. "Big_Joe@priv.operator.com", whilst Public User Identity-2 and Public User Identity-3 might be identities that the user gives to business contacts, e.g. "+46111222333@operator.com" and "joe.black@operator.com".

Figure 3A:
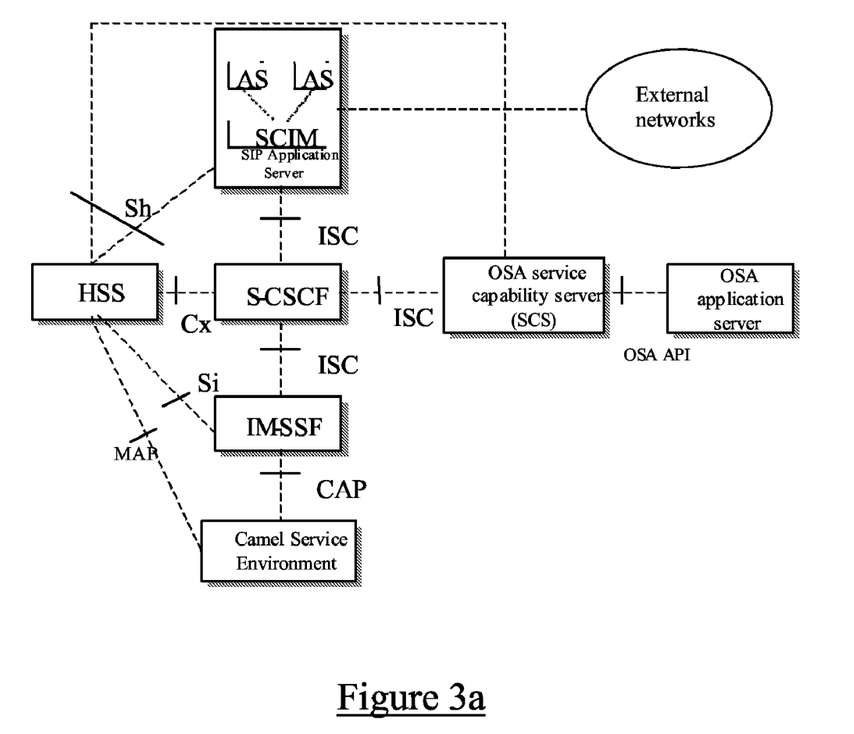
FIGS. 3a and 3b illustrates schematically certain entities of the IP Multimedia Subsystem including an application server and a Serving Call/Session Control Function.

Within the IMS service network, application servers (ASs) are provided for implementing IMS service functionality. For any given UE, one or more ASs may be associated with that terminal. FIG. 3a illustrates the IMS Service Control (ISC) interface between an AS and an S-CSCF, as well as other interfaces within the IMS. Although the AS in FIG. 3a is shown as having only a single interface to an S-CSCF, it will be appreciated that in practice the ISC interface will extend across a communication network to which many (or all) of the CSCF servers of a given operator's network are connected, allowing an AS to communicate with all of these CSCFs. [Other entities illustrated in FIG. 3a will be well known to those of skill in the art.]

Figure 3B:
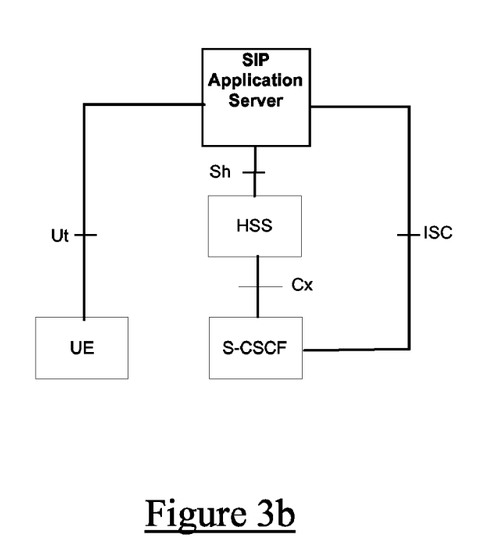

A further interface (Ut) exists between the AS and the UE (TS23.002) as illustrated in FIG. 3b. The Ut interface enables the user to manage information related to his or her services, e.g. creation and assignment of Public Service Identities, management of authorisation policies that are used for example by "presence" services, conference, policy management, etc.

SUMMARY OF THE INVENTION

According to TS 23.228, the association between IMPUs and Service Profiles, and in particular the linking of multiple IMPUs to a single Service Profile, is known to the Home Subscriber Server (HSS). However, this linking only indicates the IMPUs that share the same set of filter criteria; subscribed media etc, and provides no indication about the general user profiles stored outside the HSS (e.g. in application servers) and makes no assumptions about the relationships between the IMPUs that share the same service profile (i.e. whether they are an "alias" or not).

The inventors of the present invention have recognised that entities other than the HSS and the S-CSCF, including any Application Server(s) associated with a UE and the UE itself, are not provided with information associating service profiles with IMPUs, and yet these other entities could make use of the information. For example, an Application Server may wish to link together service configuration information associated with two IMPUs based upon these two IMPUs sharing a single Service Profile.

In the example described above with reference to FIG. 2, Public User Identity-1 is associated with a personal profile for non-business usage, and Public User Identity-2 and Public User Identity-3 are for business purposes and are expected to have the same service configuration data. It is necessary to treat actions and data related to Public User Identity-1 differently from actions and data related to Public User Identity-2 or Public User Identity-3, whilst treating actions and data associated with Public User Identity-2 and Public User Identity-3 in the same way. Thus, for example, originating sessions and terminating sessions for Public User Identity-2 and Public User Identity-3 are treated in the same way, as is supplementary service settings data such as "do-not-disturb" for the IMS-based Push-to-talk over Cellular (PoC) service, or a call-forwarding address multimedia telephony assumption.

Without the knowledge that a plurality of IMPUs are associated, an application server must store in its memory a service configuration for each IMPU. This has a serious impact on memory requirements when large numbers, e.g. millions, of IMPUs are active. Similarly, if a UE does not have this knowledge, the terminal would not know, for example, whether an operation over the Ut interface has to be repeated for each public user identifier. Where a user updates a call forwarding number via the Ut interface for multimedia telephony, the terminal does not have sufficient information as to which IMPUs it should do this for, e.g. does updating the call forwarding number for Public User Identity-3 imply that it is automatically updated for Public User Identity-2, or should the terminal also send Ut interface requests for Public User Identity-2: this misunderstanding could cause problems on some Ut interface requests such as adding a user to a group (at an application ever) in the case that the network and the UE have different understandings.

For the currently specified 3GPP releases, the IMS entities (including UEs) assume that all IMPUs are treated independently.

It is an object of the present invention to provide a means for informing entities other than the HSS of relationships between IMPUs and Service Profiles.

According to a first aspect of the present invention there is provided a Home Subscriber Server for handling IP Multimedia Subsystem subscriptions and comprising:

means for maintaining associations between public user identities and Service Profiles, where two or more public user identities can be associated with a common Service Profile; and means for identifying to a network node all public user identities that are associated with a common Service Profile.

Embodiments of the present invention are able to both reduce the memory storage requirements at a SIP application server or other network node, and reduce the signalling load within the IP Multimedia Subsystem and associated networks.

Preferably, said means for identifying sends a notification to the network node in response to a registration or re-registration procedure, a terminating call or a change of contents in the Service Profile.

Preferably, said means for identifying to a network node all public user identities associated with a common Service Profile, comprises means for sending a message to the network node containing one or more Service Profiles, each Service Profile identifying all public user identities with which it is associated.

According to an embodiment of the present invention, said message also contains, outside of the Service Profiles, a set of public user identities belonging to a common Implicit Registration Set.

According to an embodiment of the present invention, said message identifies one or more Service Profiles contained within the message, the public user identities of each identified Service Profile being considered alias public user identities.

The term "alias" as used here is considered a term of the art. It means that use or reference to one of the alias IMS Public User Identities is also use of or a reference to the other alias Public User Identity(ies), i.e. the network behaviour is, as a rule, identical for all alias identities. For example, a service data/configuration change request sent to an application server in respect of one alias IMS Public User Identity should be treated as a change request also for the other alias Public User Identity(ies). Of course, there may be exceptional cases where a service data/configuration change is relevant for only one of the alias Public User Identity(ies), for example the deletion of one of the alias Public User Identity(ies) from the network, or a change of the assigned Service Profile for an alias IMS Public User Identity.

Said network node may be a Serving Call session Control Function.

Said means for identifying may convey the required information to a Serving Call Session Control Function in a Cx Server Assignment Answer or Push Profile Request message.

According to a second aspect of the present invention there is provided a Home Subscriber Server for handling IP Multimedia Subsystem subscriptions and comprising:
  means for maintaining groupings of public user identities that are to be considered alias public user identities; and
  means for sending to a network node an identification of aliasing groups.

Preferably, said means for sending to a network node an identification of aliasing groups, sends this information in response to a registration or re-registration procedure, a terminating call or a change of contents in a Service Profile.

Said network node may be a Serving Call session Control Function or an application server.

According to a third aspect of the present invention there is provided a Call Session Control Function for servicing a user in an IP Multimedia Subsystem network, the Call Session Control Function comprising:
  means for receiving from a Home Subscriber Server, a message containing one or more Service Profiles, the or each Service Profile identifying all public user identities with which the Service Profile is associated; and
  means for associating the public user identities of at least one Service Profile as alias public user identities.

Said Call Session Control Function may comprise means for identifying public user identities belonging to an Implicit Registration Set using a list of public user identities contained outside of the received Service Profile(s).

Said Call Session Control Function may comprise means for identifying Service Profiles to which the aliasing association is to be applied.

Preferably, said Call Session Control Function comprises means for sending a notification to a user terminal or network node identifying the public user identities identified as being alias public user identities.

Said Call Session Control Function may be a Serving Call Session Control Function.

According to a fourth aspect of the present invention there is provided an Application Server for executing services in an IP Multimedia Subsystem network, the Application Server comprising:
  means for receiving from a Serving Call Session Control Function or a Home Subscriber Server, a notification that two or more public user identities are considered to be alias public user identities.

According to a fifth aspect of the present invention there is provided a user terminal for a enabling a user to access an IP Multimedia Subsystem network, the user terminal comprising:
  means for receiving from the IP Multimedia Subsystem network, a notification that two or more public user identities of the terminal are considered to be alias public user identities.

Preferably, said means is arranged in use to receive said notification from a Serving Call Session Control Function.

According to a sixth aspect of the present invention there is provided a method of operating an IP Multimedia Subsystem to inform network nodes and/or user terminals of public user identities to be considered as alias public user identities, the method comprising:
  maintaining at a Home Subscriber Server groupings of public user identities to be considered as alias public user identities; and
  distributing the grouping information to network nodes and/or user terminals.

Preferably, said groupings are maintained in Service Profiles, as the public user identities associated with the Service Profiles.

Preferably, said method comprises sending from the Home Subscriber Server to a Serving Call Session Control Function a message containing one or more Service Profiles, the or each Service Profile identifying all public user identities associated with the Service Profile, and the Serving Call Session Control Function identifying all public user identities associated with at least one Service Profile as alias public user identities.

Said message may be a Cx Server Assignment Answer or Push Profile Request message The Serving Call Session Control Function may inform an application server or user terminal of a group of public user identities to be considered alias public user identities.

Public user identities belonging to an Implicit Registration Set may be listed in said message, but outside of the Service Profile(s).

The message may identify those Service Profiles whose associated public user identities are to be considered alias public user identities.

Said step of distributing may be carried out during or subsequent to registration of a user terminal with the IP Multimedia Subsystem, or upon or subsequent to terminating a call to a user terminal, or upon a change of content of the Service Profile.

Said step of distributing may comprise sending grouping information to an application server over the Sh interface.

A user terminal may be notified that two or more of its public user identities are alias public user identities by signalling sent from an Application Server over the Ut interface.

According to a seventh aspect of the present invention there is provided a method of operating a user terminal configured for use with an IP Multimedia Subsystem, the method comprising:

receiving from the Subsystem, a notification that two or more public user identities of the terminal are to be considered alias public user identities.

According to an eighth aspect of the present invention there is provided a Session Initiation Protocol Application Server of an IP Multimedia Subsystem, the method comprising:

receiving from a Serving Call/Session Control Function or a Home Subscriber Server, a notification that two or more public user identities are to be considered alias public user identities for the purpose of handling service configurations.

According to a ninth aspect of the present invention there is provided a method of operating a Home Subscriber Server in an IP Multimedia Subsystem, the method comprising:

maintaining at the Home Subscriber Server groupings of public user identities to be considered as alias public user identities; and distributing the grouping information to network nodes and/or user terminals.

According to a tenth aspect of the present invention there is provided an IP Multimedia Subsystem comprising:

a Home Subscriber Server arranged to maintain groupings of public user identities to be considered as alias public user identities, and having means arranged, during or subsequent to registration of a user terminal with the IP Multimedia Subsystem, or upon or subsequent to terminating a call to a user terminal, to inform the terminal and/or a network node of the grouping containing a public user identity of the terminal or terminal user.

DETAILED DESCRIPTION OF CERTAIN EMBODIMENTS

Figure 5:
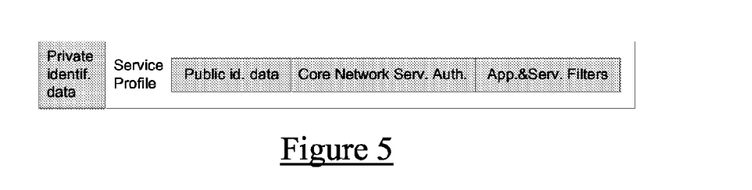
FIG. 5 illustrates schematically how data of a Service Profile are downloaded to a Serving Call/Session Control Function.
Figure 6:
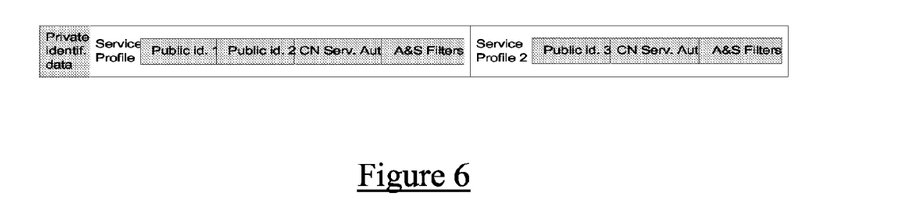
FIG. 6 illustrates schematically the structure of User Data carried on the Cx interface.

As has already been discussed, the IP Multimedia Subsystem (IMS) architecture identifies IMS users using Private User Identities. It is the Private User Identity that is used to authenticate a user upon initial registration with the IMS. A user's location on the other hand is identified by one or more IMS Public User Identities (IMPUs), and it is an IMPU that is used by third parties to contact the IMPU owner. Within a Home Subscriber Server (HSS) located within the home network (e.g. 3G core network), each IMPU is associated with a Service Profile. A Service Profile contains service data for these IMPUs, including a set of initial Filter Criteria (iFC) that are used to trigger the provision or restriction of IMS services. 3GPP defines the Service Profile structure shown in FIG. 4, and indicates the way in which this data is downloaded to the S-CSCF, as illustrated in FIGS. 5 and 6. Further details can be found in TS 29.228 and TS 29.229.

Within the HSS, one or more IMPUs may be associated with the same Service Profile. IMPUs associated with the same Service Profile are referred to here as "alias" IMPUs. 3GPP mandates that whenever a user is being registered to the IMS network with an IMPU, the HSS sends to the S-CSCF the Service Profile associated with that IMPU. 3GPP further mandates that whenever an unregistered user receives a terminating call from the IMS network, the HSS sends to the S-CSCF the Service Profile associated with the called user's IMPU. Whenever a Service Profile is modified in the HSS, the HSS must send the modified Service Profile to the S-CSCF for each associated IMPU.

3GPP defines a so-called "Implicit Registration Set" concept to identify a set of IMPUs that work as a group, and which are registered and deregistered together when any one of the IMPUs of the set is registered or deregistered. 3GPP mandates that the HSS send the Implicit Registration Set to the S-CSCF upon registration of a user or upon terminating a call. It has been understood that (at registration or call termination) the HSS identifies all IMPUs within the Implicit Registration Set, and then identifies all of the Service Profiles associated with these IMPUs. The Service Profiles (or selected data from the Service Profiles) containing the IMPUs with which they are associated, are then sent to the S-CSCF. This is illustrated in FIG. 6. As a result of this operation, the S-CSCF knows all of the IMPUs that belong to the same Implicit Registration Set, as well as their Service Profiles.

As has already been noted, the fact that two or more IMPUs are associated with a single Service Profile (within the HSS) can be used to associate service configuration data for these IMPUs at other network nodes or at the user terminal (UE). It might be thought that the Implicit Registration Set concept provides an appropriate vehicle for distributing associations between IMPUs and Service Profiles through the IMS (at least between the HSS and the S-CSCF). However, such an approach would run counter to the intended purpose of the Implicit Registration Set, i.e. to implicitly register a number of IMPUs independently of the Service Profiles with which the IMPUs are associated. For example, it may well be desirable to include both personal and business related IMPUs in a user's Implicit Registration Set, whilst maintaining separate Service Profiles for the two types of identities. This will be clear from the example of FIG. 6, where IMPUs Public id.1, Public id.2, and Public id.3 belong to the same Implicit Registration Set, but are not all associated with the same Service Profile. It is important therefore that the alias IMPUs are not bound to the Implicit Registration Set.

Figure 7:
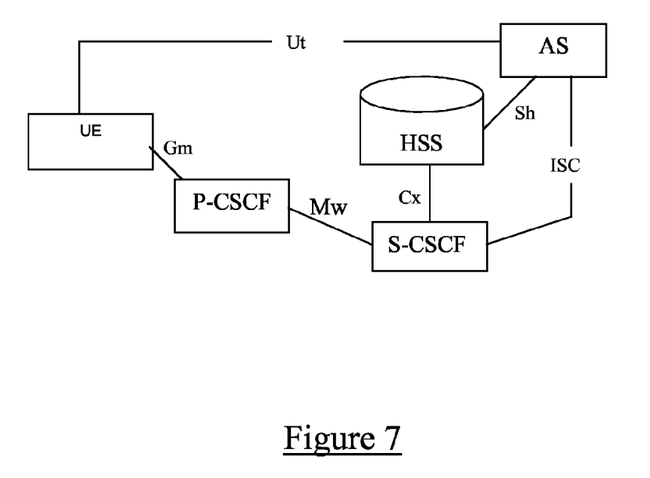
FIG. 7 illustrates schematically the relationship and interfaces between entities of an IP Multimedia Subsystem.

A preferred approach is to expose the IMPUs associated with a Service Profile on the Ut, Sh, ISC and/or Gm interfaces, and to inform network nodes or UEs receiving this information that IMPUs associated with the same Service Profile should be considered alias public user identities. FIG. 7 shows the various interfaces that can be used to distribute the relationship between IMPUs and Service Profiles from the HSS to entities such as the S-CSCF, the AS and the terminal. The HSS makes the information available to the S-CSCF over the Cx interface, and to the ASs via the Sh interface after registration (possibly initiated due to the registration process). The S-CSCF makes the information available to the P-CSCF over the Mw interface (not shown in the Figures), and the P-CSCF exposes this to the terminal over the Gm interface during registration. The S-CSCF also makes this available to the AS over the ISC interface.

The Sh interface should also be able to recognise that IMPUs associated with the same Service Profile access the same data in the HSS. Operations performed over the Ut and the Sh interfaces for one IMPU are deemed to have been performed for all IMPUs associated with the same Service Profile. [The Service Profile may be completely contained in an implicit registration set, though an implicit registration can encompass more than one Service Profile.]

A number of different solutions as to how the S-CSCF can receive and interpret the grouping set from the HSS are envisaged.

Solution A1: Advertise the IMPUs belonging to a Service Profile within the Service Profile The grouping of IMPUs belonging to a Service Profile must coexist with the Implicit Registration Set within the same commands over the Cx interface, and shall be advertised whenever the user profile is downloaded from the HSS, i.e., at registration (or re-registration), termination of a call, or when the user profile is changed in the HSS.

This solution requires that the Implicit Registration Set be advertised in a new information element (attribute value pair or AVP) alongside the Service Profile. The grouping concept (alias public user identities) is advertised inside the Service Profile as transferred on the Cx interface whenever the user profile is downloaded. That is, the Implicit Registration Set is explicitly indicated on the Cx interface; and the IMPUs included in the Service Profile (as transmitted on the Cx interface) indicate the alias grouping. The Cx messages which carry the Service Profiles are the Server Assignment Answer (SAA) and the Push Profile Request (PPR). In this solution, the Service Profile stored at the HSS remains unchanged, as it is defined in TS 29.228 (see FIG. 5), but it is indicated that the public Identification instance refers to the IMPUs that are related to that Service Profile.

The Cx interface is modified in the following way, where the underlined text identifies the new AVPs:

--- downloading of the profile at registration or terminating call time (SAA)
    <Server-Assignment-Answer> ::= < Diameter Header: 301, PXY, 16777216 >
        < Session-Id >
        { Vendor-Specific-Application-Id }
        [ Result-Code ]
        [Experimental-Result ]
        { Auth-Session-State }
        { Origin-Host }
        { Origin-Realm }
        [ User-Name ]
        *[Public-Identity] –> set of implicit registration set, if exists
        *[ Supported-Features ]
        [User-Data] -> contains the IMPUs related to a SP according to 29.228 annex D
        [ Charging-Information ]
        *[ AVP ]
        *[ Failed-AVP ]
        *[ Proxy-Info ]
        *[ Route-Record ]
downloading of the profile when the profile changes (PPR)
    < Push-Profile-Request > ::= < Diameter Header: 305, REQ, PXY, 16777216 >
        < Session-Id >
        { Vendor-Specific-Application-Id }
        { Auth-Session-State }
        { Origin-Host }
        { Origin-Realm }
        { Destination-Host }
        { Destination-Realm }
        { User-Name }

-continued

*[Public-Identity] –> set of implicit registration set, if exists
        *[ Supported-Features ]
        [User-Data] -> contains the IMPUs related to a SP according to 29.228 annex D
        [ Charging-Information ]
        *[ AVP ]
        *[ Proxy-Info ]
        *[ Route-Record ]

--- where the User Data is according to TS 29.228 and as illustrated in FIG. 6.

Solution A2: Define the Grouping Concept within the Interfaces

Figure 8:
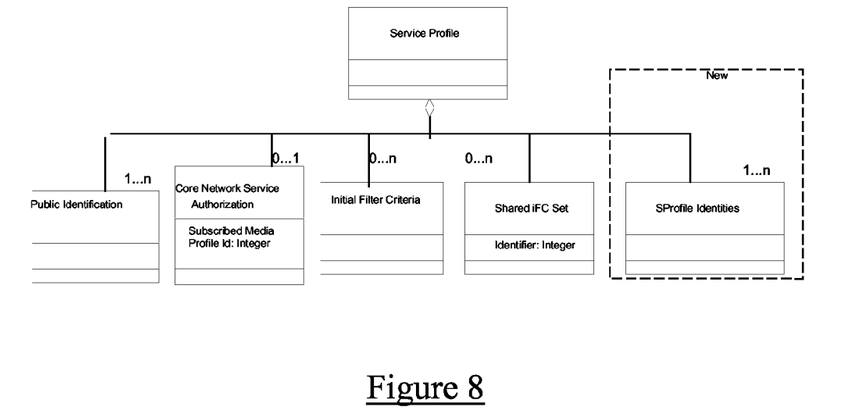
FIG. 8 illustrates schematically the structure of a Service Profile according to an embodiment of the present invention.

This approach is to introduce a new grouping concept into the HSS that identifies which IMPUs are associated. It requires that the Service Profile as defined in TS 29.228 be modified by adding a new instance called SProfile Identifier. This is illustrated in FIG. 8. The SProfile Identifier instance indicates all IMPUs belonging to that Service Profile. The Implicit Registration Set is kept within the Service Profile. This would result in an additional AVP on the Cx interface (within the SAA or PPR) which would transport the information about the IMPUs which are considered alias public user identities.

Solution A3: Introduce Indication of Alias Interpretation

Considering further solution A1, this can be simplified by making the assumption that IMPUs associated with a single Service Profile will always belong to the same Implicit Registration Set. Assuming that the aliasing concept is turned on for all Service Profiles, there is no need to identify any IMPUs outside of the Service Profile data carried on the line. However, if the aliasing concept is not turned on by default, it will be necessary to identify those Service Profiles to which aliasing applies. Referring to FIG. 6, it may be, for example, that aliasing is turned on only for Service Profile 1.

Different solutions are envisaged as to how the application server can receive the grouping set.

Solution B1: The S-CSCF Reports the Information Via the ISC. A Number of Implementations are Possible.

a) Advertise the IMPUs belonging to a single Service Profile in the 3rd party registration.

As per the existing 3GPP specifications, an S-CSCF can be instructed to send a SIP REGISTER message to an application server. This is known as a 3rd party registration. This approach is to include new data in the registration message between the S-CSCF and the application server which conveys the information about which IMPUs are alias public user identities.

b) Advertise the IMPUs belonging to a single Service Profile by subscribing to a registration event.

Currently, in order for an application server to obtain information about the implicitly registered IMPUs, an application server can subscribe (send a SUBSCRIBE message) to the S-CSCF which previously sent a REGISTER message to the application server. The S-CSCF will then send a NOTIFY message to the application server containing information about the registered IMPUs. The proposal is to extend the contents of the NOTIFY message to include information about which IMPUs are alias public user identities.

Solution B2: The AS Receives the Information Via the Sh

The AS asks for the IMPU alias information via the Sh interface in the same way that it already asks for the IMPUs belonging to an Implicit Registration Set or the IMPUs under the same IMPI.

Currently The AS sends a Sh-Read to the HSS indicating within Identity-Set AVP:
  ALL_IDENTITIES (0)
  REGISTERED_IDENTITIES (1)
  IMPLICIT_IDENTITIES (2)

In order to cause the Service Profile grouping to be downloaded, a new value is added to the message:
  SERVICE_PROFILE_IDENTITIES (3)

Hence the HSS receives a Public-Identity as entry key (when any operation is made via Ut e.g.), and returns all other IMPUs associated with the same profile as the IMPU that the HSS indicated in the request.

Different solutions are also envisaged as to how the mobile terminal can receive the grouping set.

For example, two possible solutions are:

Solution C1: Include the Grouping of the IMPUs in the 200 OK Message of the Registration Phase.

Include the information of grouping of the public user identifiers in the 200 OK sent in response to the Registration message. This would be in the form of an additional SIP header to the implicit registration set.

Solution B2: Include the Grouping of the IMPUs in the Registration Event Package.

Include the information of the grouping of the IMPUs in the NOTIFY message sent in response to the registration event package.

Solutions B1 and B2 complement each other and so are not necessarily mutually exclusive alternatives.

Whilst the mechanisms described above relate to the distribution of data within one operator network and the mobile terminals that connect to that network, the underlying principle of sharing grouping information extends to passing the grouping information to other networks (by including the relevant information on the Network-Network Interface), e.g. between the network of an operator A and the network of an operator B. Two examples are given here to illustrate when it could be of interest to pass grouping information from one network to another network.

1. Presence:

A subscriber of operator A (user A) includes a subscriber of operator B as an allowed presence watcher (user B), i.e. user A has authorised user B (using a particular Public User Identifier of user B) to monitor the presence of user A. However, User B has two (or more) IMPUs, and the one that is used (by user B) to monitor the presence of user A is not the one that user A has authorised. By conveying the grouping information for user B to network A so that user B is able (using any of its IMPUs sharing the same Service Profile) to monitor the presence of user A.

2. Accept Reject Lists:

In for example push-to-talk-over-cellular (PoC), a terminating PoC AS can access the accept and reject lists in the XDMS for the terminating user in order to determine whether a terminating PoC request can be terminated to a user. Hitherto, this may not have worked properly in the case that a user can be identified by more than one means (public user identifier). An embodiment of the invention provides a solution to this problem by including the grouping data in a SIP message that creates a new SIP session (e.g. an INVITE). The semantics of such data could be "User X is also known as {list of grouped public user identifiers}".

It will be appreciated by the person of skill in the art that various modifications may be made to the above described embodiments without departing from the scope of the present invention.

The invention claimed is:

1. A Home Subscriber Server for handling IP Multimedia Subsystem subscriptions comprising:
  means for maintaining associations between public user identities and Service Profiles, each public user identity associated with a service profile, two or more public user identities being associated with a common Service Profile; and
  means for identifying to a network node all public user identities other than those belonging to an Implicit Registration Set, that are associated with the common Service Profile.

2. The Home Subscriber Server according to claim 1, further comprising means for identifying to the network node all public user identities outside of the service profile and belonging to the Implicit Registration Set.

3. The Home Subscriber Server according to claim 1, wherein said means for identifying sends a notification to the network node in response to a registration or re-registration procedure, a terminating call or a change of contents in the Service Profile.

4. The Home Subscriber Server according to claim 1, wherein said means for identifying to a network node all public user identities associated with a common Service Profile comprises
  means for sending a message to the network node containing one or more Service Profiles, each Service Profile identifying all public user identities with which it is associated, other than those belonging to the Implicit Registration Set.

5. The Home Subscriber Server according to claim 4, said message identifying one or more Service Profiles contained within the message, the public user identities of each identified Service Profile being considered alias public user identities.

6. The Home Subscriber Server according to claim 1, wherein said network node is a Serving Call session Control Function.

7. The Home Subscriber Server according to claim 1, wherein said means for identifying conveys the required information to a Serving Call Session Control Function in a Cx Server Assignment Answer or Push Profile Request message.

8. A Call Session Control Function for servicing a user in an IP Multimedia Subsystem network, the Call Session Control Function comprising:
  means for receiving from a Home Subscriber Server, a message containing one or more Service Profiles, the one or more Service Profiles identifying all public user identities, other than those belonging to an Implicit Registration Set, with which the Service Profile is associated; and
  means for associating the public user identities of at least one Service Profile as alias public user identities.

9. The Call Session Control Function according to claim 8, comprising means for identifying public user identities belonging to an Implicit Registration Set using a list of public user identities contained outside of the received Service Profile(s).

10. The Call Session Control Function according to claim 8 comprising means for identifying Service Profiles to which the aliasing association is to be applied.

11. The Call Session Control Function according to claim 8 comprising means for sending a notification to a user terminal or network node identifying the public user identities, other than those belonging to an Implicit Registration Set, and identified as being alias public user identities.

12. The Call Session Control Function according to claim 8, the Call Session Control Function being a Serving Call Session Control Function.

13. A method of operating an IP Multimedia Subsystem to inform network nodes and/or user terminals of public user identities to be considered as alias public user identities, the method comprising:
   maintaining at a Home Subscriber Server groupings of public user identities. other than those belonging to an Implicit Registration Set, to be considered as alias public user identities; and
   distributing the grouping information to network nodes and/or user terminals during or subsequent to registration of a user terminal with the IP Multimedia Subsystem, or upon or subsequent to terminating a call to a user terminal, or upon a change of content of the Service Profile.

14. The method according to claim 13, wherein said step of distributing comprises sending grouping information to an application server over the Sh interface.

15. The method according to claim 13, wherein said groupings are maintained in Service Profiles, as the public user identities associated with the Service Profiles.

16. The method according to claim 15, comprising
   sending from the Home Subscriber Server to a Serving Call Session Control Function a message containing one or more Service Profiles, the one or more Service Profiles identifying all public user identities other than those belonging to an Implicit Registration Set and associated with the Service Profiles, wherein the message identifies those Service profiles whose associated public user identities are to be considered alias public user identities; and the Serving Call Session Control Function identifying these public user identities associated with at least one Service Profile as alias public user identities.

17. The method according to claim 16, said message being a Cx Server Assignment Answer or Push Profile Request message.

18. The method according to claim 16, the Serving Call Session Control Function informing an application server or user terminal of a group of public user identities, other than those belonging to an Implicit Registration Set to be considered alias public user identities, wherein public user identities belonging to an Implicit Registration Set are listed in said message, but outside the Service Profile(s).

19. The method according to claim 18, wherein a user terminal is notified that two or more of its public user identities, other than those belonging to an Implicit Registration Set, are alias public user identities by signaling sent from an Application Server over the Ut interface.

20. A Home subscriber Server for handling IP Multimedia Subsystem subscriptions and comprising:
   means for maintaining associations between public user identities and Service Profiles, each public user identity associated with a service profile and wherein two or more public user identities can be associated with a common Service Profile;
   means for identifying to a network node all public user identities belonging to an Implicit Registration Set; and
   characterized by means for identifying to the network node all public user identities not belonging to the Implicit Registration Set and associated with the common service profile.

* * * * *

UNITED STATES PATENT AND TRADEMARK OFFICE
CERTIFICATE OF CORRECTION

PATENT NO. : 8,195,155 B2
APPLICATION NO. : 11/913039
DATED : June 5, 2012
INVENTOR(S) : Terrill et al.

Figure 4:
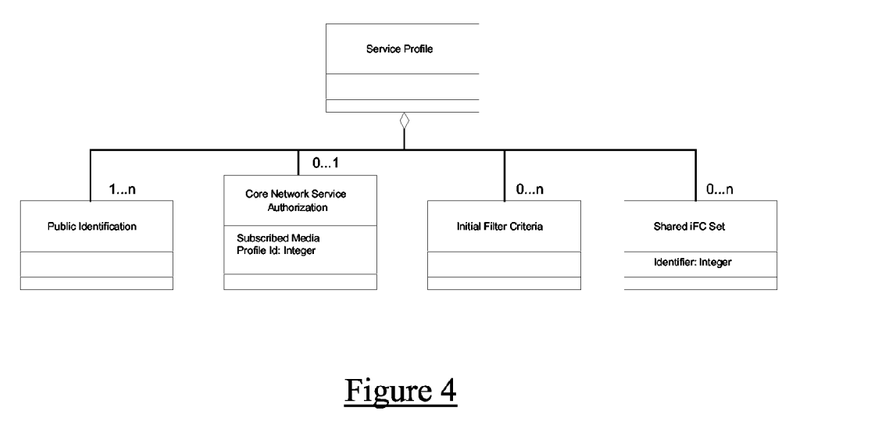
FIG. 4 illustrates schematically the structure of a Service Profile.

It is certified that error appears in the above-identified patent and that said Letters Patent is hereby corrected as shown below:

In Fig. 4, Sheet 3 of 4, delete "  " and insert --  --, therefor.

In Fig. 4, Sheet 3 of 4, delete "  " and insert --  --, therefor.

In Fig. 5, Sheet 3 of 4, delete " "

and insert -- --, therefor.

Signed and Sealed this
Thirteenth Day of November, 2012

David J. Kappos
*Director of the United States Patent and Trademark Office*

In Fig. 8, Sheet 4 of 4, delete "  " and insert -- -- , therefor.

In Fig. 8, Sheet 4 of 4, delete "  " and insert -- -- , therefor.

In Column 6, Line 51, delete "message" and insert -- message. --, therefor.

In Column 7, Line 42, delete "Identities; and" and insert -- Identities; --, therefor.

In Column 7, Line 52, delete "interface; and" and insert -- interface; --, therefor.

In Column 7, Line 54, delete "Subsystem;" and insert -- Subsystem; and --, therefor.

In Column 10, Line 6, delete "Charging-lnformation" and insert -- Charging-Information --, therefor.

In Column 11, Line 8, delete "Currently The" and insert -- Currently the --, therefor.

In Column 11, Line 53, delete "push-to-talk-over-cellular" and insert -- push-to-talk over cellular --, therefor.

In Column 13, Line 9, in Claim 13, delete "identities. other" and insert -- identities other --, therefor.

UNITED STATES PATENT AND TRADEMARK OFFICE
CERTIFICATE OF CORRECTION

| | |
|---|---|
| PATENT NO. | : 8,195,155 B2 |
| APPLICATION NO. | : 11/913039 |
| DATED | : June 5, 2012 |
| INVENTOR(S) | : Terrill et al. |

Page 1 of 1

It is certified that error appears in the above-identified patent and that said Letters Patent is hereby corrected as shown below:

On Title page, item (75), under Inventors, delete "Nuria Vares Esteban" and insert -- Nuria Esteban Vares --, therefor.

Signed and Sealed this
Ninth Day of February, 2016

Michelle K. Lee
*Director of the United States Patent and Trademark Office*